US006256507B1

(12) United States Patent
Lemieux

(10) Patent No.: US 6,256,507 B1
(45) Date of Patent: Jul. 3, 2001

(54) TELECOMMUNICATIONS NETWORK SYNCHRONIZATION FOR DATA SERVICES

(75) Inventor: Yves Lemieux, Kirkland (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/144,795

(22) Filed: Aug. 31, 1998

(51) Int. Cl.$^7$ .................................................. H04B 7/005
(52) U.S. Cl. ............................................. 455/502; 455/427
(58) Field of Search ..................................... 455/422, 427, 455/456, 12.1, 13.2, 502, 560, 561; 370/345, 350, 324; 342/357.06, 357.09, 357.1; 375/356

(56) References Cited

U.S. PATENT DOCUMENTS

| 5,525,999 | * | 6/1996 | King et al. | 342/357.06 |
|---|---|---|---|---|
| 5,548,583 | * | 8/1996 | Bustamante | 455/561 |
| 5,594,739 | * | 1/1997 | Lemieux | 455/502 |
| 5,930,722 | * | 7/1999 | Han et al. | 455/502 |
| 6,072,847 | * | 6/2000 | Dupuy et al. | 455/502 |

FOREIGN PATENT DOCUMENTS

| 0 450 828 | 3/1991 | (EP) . |
|---|---|---|
| 0 668 667 | 7/1994 | (EP) . |
| 2 310 098 | 2/1996 | (GB) . |
| WO 94/08405 | 4/1994 | (WO) . |
| WO 98/18206 | 4/1998 | (WO) . |

OTHER PUBLICATIONS

PCT International Search Report, Dec. 17, 1999, PCT/SE99/01330.
"Digital Network Synchronization Plan", Issue 2, Jun. 1993; Bell Communications Research Technical Advisory TA–NWT–000436.

* cited by examiner

Primary Examiner—Marsha D. Banks-Harold
(74) Attorney, Agent, or Firm—Jenkens & Gilchrist

(57) ABSTRACT

A star network type topology is implemented for a network synchronization system wherein synchronization information radiates from a centralized primary reference source comprising the global positioning system (GPS). A GPS receiver installed at each mobile switching center and base station of a wireless communications network supplies a stratum 1 classified clock pulse to a local clock. The local clock trains to this clock pulse and generates a corresponding stratum 1 classified synchronization clock pulse for controlling timing operations of the mobile switching center or base station. In the event the GPS primary reference source fails or its accuracy degrades, a change is made to a tree or linear network type topology wherein the synchronization information flows downstream from the mobile switching center local clocks to the base stations. Operation of the network synchronization system is coordinated through a synchronization manager maintained by the transport network management system of the network. Highly accurate synchronization using these topologies supports the provision of value added services such as mobile station locating and information time stamping.

20 Claims, 4 Drawing Sheets

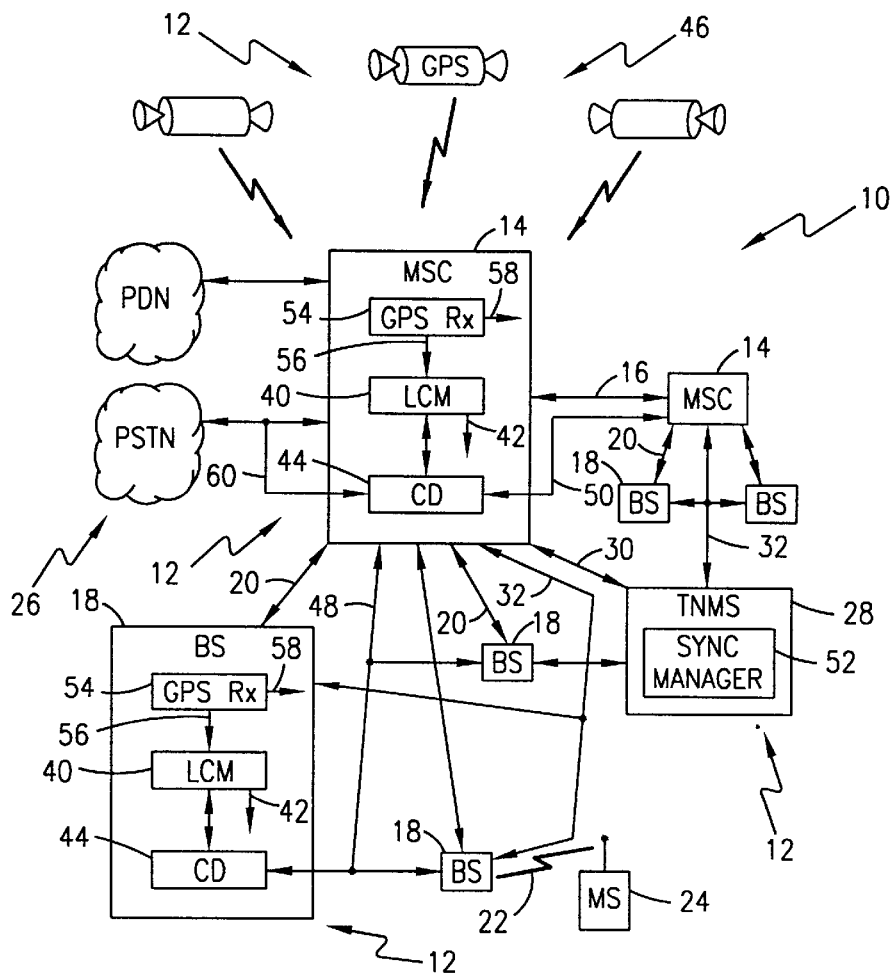
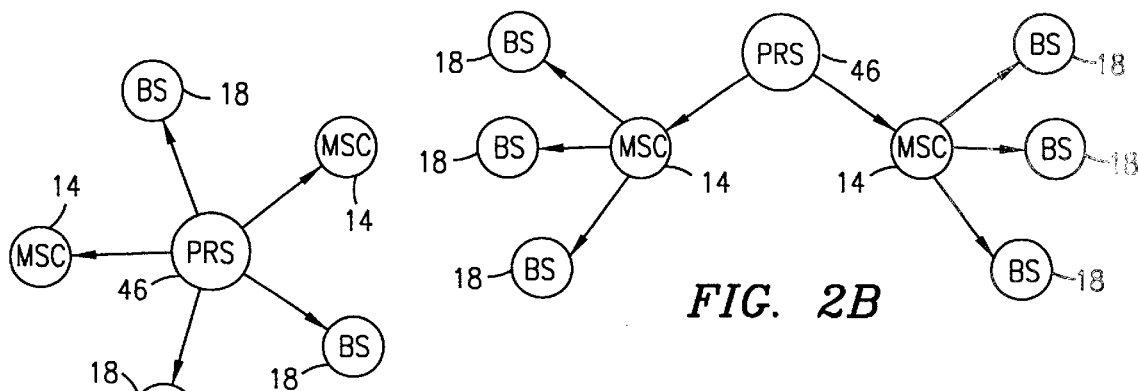
FIG. 1
FIG. 2A
FIG. 2B

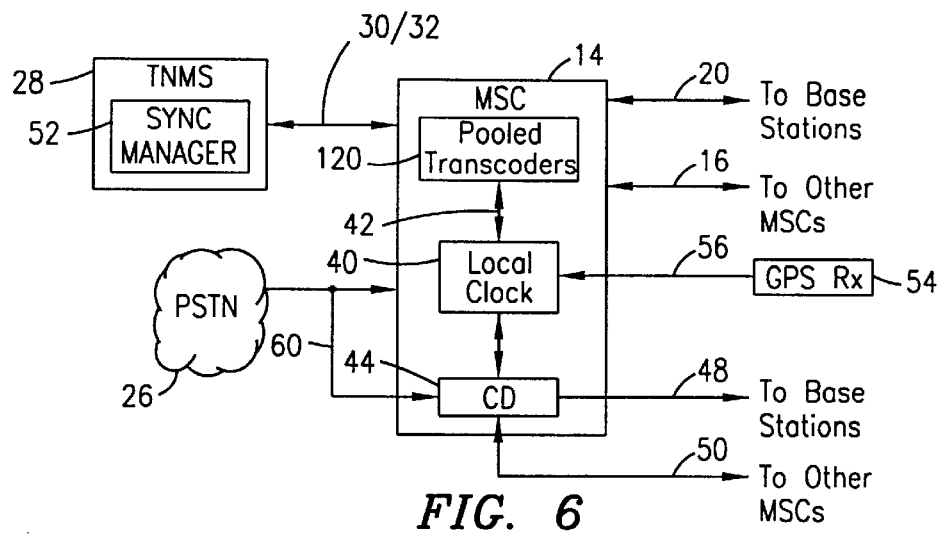
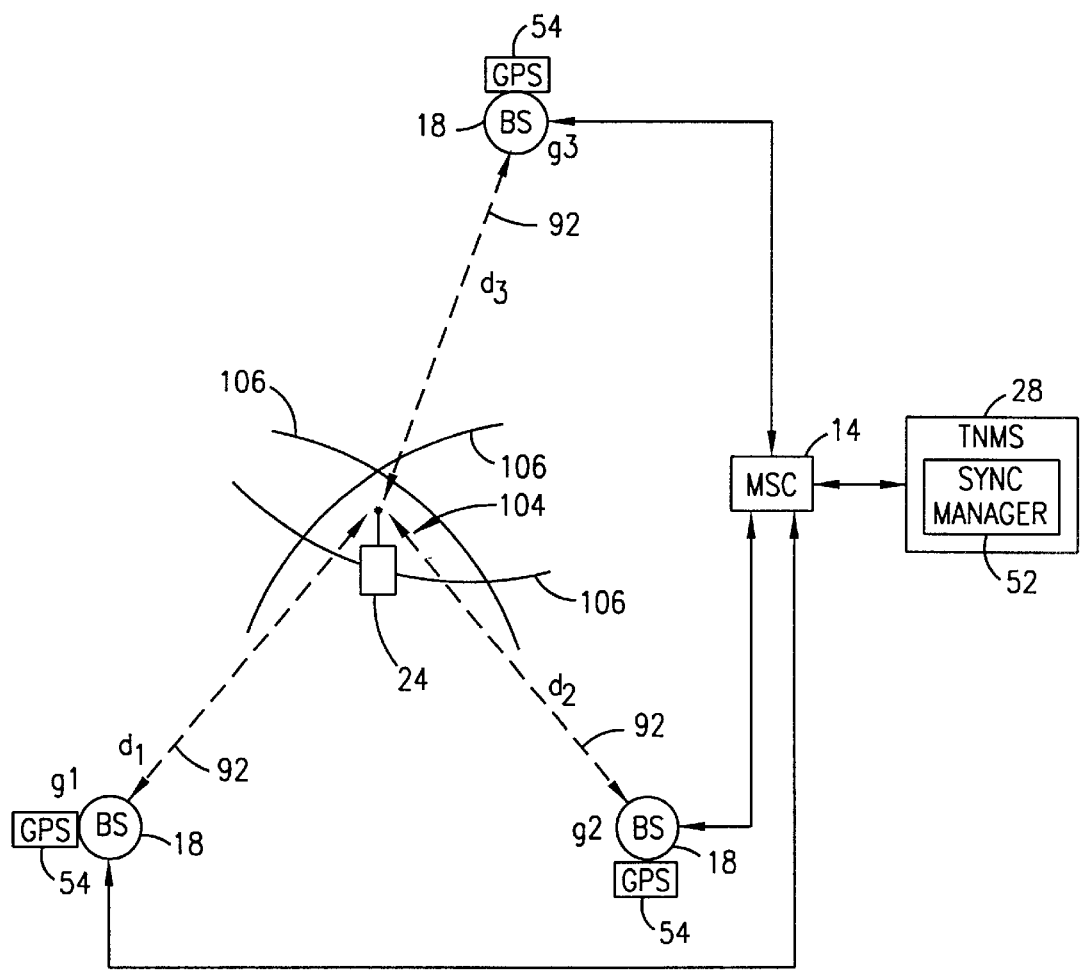
FIG. 6
FIG. 4

TELECOMMUNICATIONS NETWORK SYNCHRONIZATION FOR DATA SERVICES

BACKGROUND OF THE INVENTION

1. Technical Field of the Invention

The present invention relates to telecommunications network and, in particular, to a system for providing synchronization within a telecommunicatings network that supports data communications services.

2. Description of Related Art

Most telecommunications networks require synchronization in order to prevent impairments in the provision of communications services. Synchronization is generally effectuated through master-slave arrangements.

As an example, some wireless telecommunications networks utilize a primary reference source (PRS) clock derived from the pulse code modulated (PCM) communications carried by the connected public switched telephone network (PSTN). When considering voice services, this master-slave PSTN derived, stratum 4 classified, clock relationship operates quite effectively, even considering the consequences of frame losses due to clock slips in the transport network.

As demand for data (as opposed to voice) services increases, however, maintenance of more stringent synchronization requirements within the transport network becomes a more significant and pressing concern to the system operator. This is because data services require much tighter timing specifications to ensure that the transport network is not lossy. A clock slip that would cause little to no discernable disruption in provided voice services may result in a significant bit/byte/word loss of transported data. Such a loss is costly as it not only degrades the data service being provided, but also introduces delays in communication necessitated by having to re-transmit lost information. As such, there is an increasing need for a stratum 1 classified synchronization for use in wireless telecommunications networks providing data services.

SUMMARY OF THE INVENTION

Stratum 1 classified synchronization within a wireless communications network is provided by installing a global positioning system (GPS) receiver at each mobile switching center of the network. A local clock maintained within each mobile switching center receives a GPS sourced stratum 1 classified clock pulse from its associated GPS receiver. By training to this clock pulse, the local clock can generate a synchronization clock pulse having a corresponding stratum 1 classification for application to the operations of the mobile switching centers. A star network type topology is thus provided for the synchronization system with synchronization information radiating from a centralized primary reference source (PRS) comprising the global positioning system to each of the network nodes. As a further enhancement, the GPS receiver may also be installed at each base station for use in training base station local clocks to generate stratum 1 classified synchronization clock pulses in an extended star network type topology.

In the event the global positioning system primary reference source fails or its accuracy unacceptably degrades, the primary reference source for the network synchronization system is changed to the local clock within each of the mobile switching centers. This change is coordinated through a synchronization manager maintained by the transport network management system of the network. Through a network supported clock distribution system, the local clock within each mobile switching center synchronizes its connected base stations. In this back-up mode of operation, a tree or linear network type topology is thus provided for the network synchronization system with synchronization information flowing downstream to the base stations from each mobile switching center.

Primary use of the star network type topology for the network synchronization system makes it possible for the wireless communications network to offer a number of value added services such as a service for geographically locating traveling mobile stations and a service for time stamping wireless communications network communications.

Provision of these services is coordinated through the synchronization manager of the transport network management system. With respect to the locating service, the highly accurate synchronization provided through the star network type topology makes it possible for the base stations to very accurately calculate propagation delays for base station handled communications to and from mobile station. If such delay information is collected from several base stations with respect to a single mobile station, a triangulation/arcuation algorithm may be executed to process the measured delays and accurately determine mobile station position relative to the base station geo-coordinate data supplied by the GPS receivers. With respect to the time stamping service, the highly accurate synchronization provided through the star network type topology and time of day information supplied by the GPS receivers provides a highly accurate system clock supporting the time stamping of information handled by pooled transcoders within each mobile switching center.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 is a block diagram of a wireless communications network utilizing a global positioning system (GPS) assisted synchronization system;

FIGS. 2A, 2B and 2C are diagrams illustrating a star network topology, tree network topology and linear network topology modes of operation, respectively, for the synchronization system of the present invention;

FIG. 4 is a diagram illustrating provision of a service for geographically locating a traveling mobile station;

FIG. 6 is a more detailed block diagram of the mobile switching center supporting provision of a service for time stamping pooled transcoder handled data communications.

DETAILED DESCRIPTION OF THE DRAWINGS

Figure 2C:
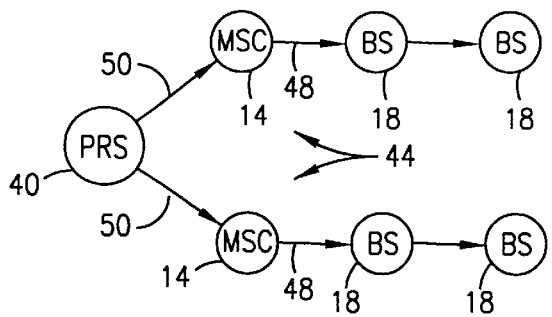

Reference is now made to FIG. 1 wherein there is shown a block diagram of a wireless communications network 10 utilizing a global positioning system (GPS) assisted synchronization system 12. The wireless communications network 10 includes a plurality of mobile switching centers 14. These mobile switching centers 14 are interconnected by voice and signaling connections (collectively referred to at 16) forming a transport network. The wireless communications network 10 further includes a plurality of base stations 18 connected over communications links 20 to each of the mobile switching centers 14. Each base station 18 serves a cell (not shown) of the wireless communications network 10, and is used to support radio frequency communications over an air interface 22 with one or more mobile stations 24 located within that cell. At least one of the mobile switching centers 14 provides an interface (e.g., a gateway) to other communications networks 26 such as, for example, the public switched telephone network (PSTN) or a packet data network (PDN) like a local or wide area data communications network (LAN/WAN). The wireless communications network 10 supports wireless voice and data communications to and from the mobile stations 24 in a manner well known to those skilled in the art.

The wireless communications network 10 further includes a transport network management system (TNMS) 28 for handling and coordinating all operations and maintenance (O&M) related functions. The transport network management system 28 is connected using communications link 30 to at least one mobile switching center 14 of the wireless communications network 10. In this environment, all transport network management system 28 related operations and maintenance data is funneled through the communications link 30. Communication of transport network management system 28 related data throughout the wireless communications network 10 is accomplished through the use of an operations and maintenance channel embedded within the communications links 16 and 20 (forming the transport network) that interconnect the mobile switching centers 14 and base stations 18 and are also being used to carry subscriber voice/data communications and network signaling. Alternatively, the transport network management system 28 is connected to each of the mobile switching centers 14 and base stations 18 of the wireless communications network 10 using a separate data communications network 32 (such as, for example, an X.25 network). All transport network management system 28 related operations and maintenance data in this implementation is carried by the network 32 separate and apart from any subscriber voice/data communications and network signaling.

The synchronization system 12 for the wireless communications network 10 includes a local clock module (LCM) 40 within each of the mobile switching centers 14 and base stations 18. The local clock module 40 generates and supplies a synchronization clock pulse to its connected mobile switching center 14 or base station 18 over clock link 42. Each local clock module 40 is connected to a clock distribution (CD) system 44 within each of the mobile switching centers 14 and base stations 18. The clock distribution system 44 within each mobile switching center 14 is further connected to the clock distribution systems within each of the plural base stations 18 connected to that mobile switching center using a unidirectional communications link 48. The link 48 is referred to as unidirectional because clock related information is passed only in the down direction from the mobile switching center 14 to its base stations 18. The plural mobile switching center 14 clock distribution systems 44 are interconnected over bi-directional communications links 50, and at least one of the mobile switching center clock distribution systems is connected to the public switched telephone network 26. The link 50 is referred to as bi-directional because clock related information is exchanged between mobile switching centers 14 in order to provide coordination of synchronization within the network 10. Through the link 30 or network 32 connection, a synchronization manager functionality 52 of the transport network management system 28 is connected to each of the clock distribution systems 44. The synchronization manager functionality 52 operates to control synchronization within the network by specifying network synchronization modes and actions, including controlling use of the clock distribution systems 44.

A plurality of global positioning system (GPS) receivers 54 are installed throughout the transport network to receive communications from a supporting global positioning system satellite network 46. More particularly, a GPS receiver 54 is installed for use with each mobile switching center 14 (and also, perhaps if needed, with each base station 18) of the wireless communications network 10. These GPS receivers 54 are utilized to provide three important pieces of information to its associated mobile switching center 14 or base station 18. The supplied information comprises: 1) a stratum 1 classified clock pulse; 2) time/date information; and 3) geo-coordinate (longitude and latitude) information for the mobile switching center or base station site. The GPS receiver 54 included for use with the mobile switching center 14 or base station 18 is connected over link 56 to supply the GPS supported stratum 1 classified clock pulse to the local clock module 40. The GPS receiver 54 included for use with the mobile switching center 14 or base station 18 is further connected over link 58 to supply the time/date information and geo-coordinate information to the processing functionalities (not shown) of the mobile switching center or base station for use in providing value added service (as will be discussed in greater detail below).

The synchronization system 12 supports three modes of operation relating to the generation of the synchronization clock pulse by the local clock modules 40 of the mobile switching centers 14 and base stations 18. In a first mode of operation, each local clock module 40 trains to the GPS receiver 54 supplied stratum 1 classified clock pulse to generate and output the synchronization clock pulse to the mobile switching centers 14 and base stations 18 having a corresponding stratum 1 classification. The supporting global positioning system 46 accordingly comprises the primary reference source (PRS) for synchronization information within the wireless communications network 10. This first mode of operation thus advantageously implements a star network type topology (see, FIG. 2A) on the synchronization system 12 with synchronization information radiating from a single GPS 46 primary reference source to each local clock module 40. Coordination of network node (i.e., mobile switching center or base station) synchronization to the GPS clock pulse and derivation of a system clock is provided through the synchronization manager functionality 52. In a second mode of operation, implemented when the GPS network 46 or the GPS receiver 54 fails to support primary reference source operation by generating the necessary stratum 1 classified clock pulse or perhaps because the synchronization manager functionality 52 of the transport network management system 28 in monitoring network 10 operation notices a degradation in timing tolerances below an acceptable level, the synchronization manager functionality coordinates a network change of the primary reference source designation from GPS to local clock. Each local clock module 40 then operates in a "hold-over mode" to generate the synchronization clock pulse for its node having a stratum 2 classification to the mobile switching centers 14 and base stations 18 based on its prior training to the no-longer available GPS receiver 54 generated stratum 1 classified clock pulse. Synchronization is maintained between each mobile switching center 14 and its connected base stations 18 to derive the system clock through the transmission of unidirectional synchronization information through the clock distribution system 44 and over the communications link 48. This second mode of operation thus implements a tree or linear network type topology (see, FIGS. 2B and 2C) on the synchronization system 12 with synchronization information originating at the local clock primary reference source and flowing downstream through the clock distribution system 44 to the local clock modules 40. In a third mode of operation, implemented when both the GPS and local clock primary reference sources are unavailable or perhaps because the synchronization manager functionality 52 of the transport network management system 28 in monitoring network 10 operation notices a degradation in timing tolerances below an acceptable level, the synchronization manager functionality 52 changes the primary reference source designation to PSTN 26 pulse code modulated (PCM) communication derived timing. Through the mobile switching center clock distribution system 44 connection 60 to the public switched telephone network 26, synchronization information is collected from the pulse code modulated voice/data communications links of the public switched telephone network to generate a synchronization clock pulse having a stratum 3E (E for enhanced) classification. The collected synchronization information is communicated by the clock distribution system 44 between the mobile switching centers 14 using the communications links 50 in order to derive a system clock. Synchronization is maintained between each mobile switching center 14 and its connected base stations 18 through the transmission of unidirectional synchronization information through the clock distribution system 44 and over the communications link 48. This third mode of operation thus similarly implements a tree or linear network type topology on the synchronization system 12 with synchronization information originating at the PSTN primary reference source and flowing downstream through the clock distribution system 44 to the mobile switching centers 14 and base stations 18.

Figure 3:
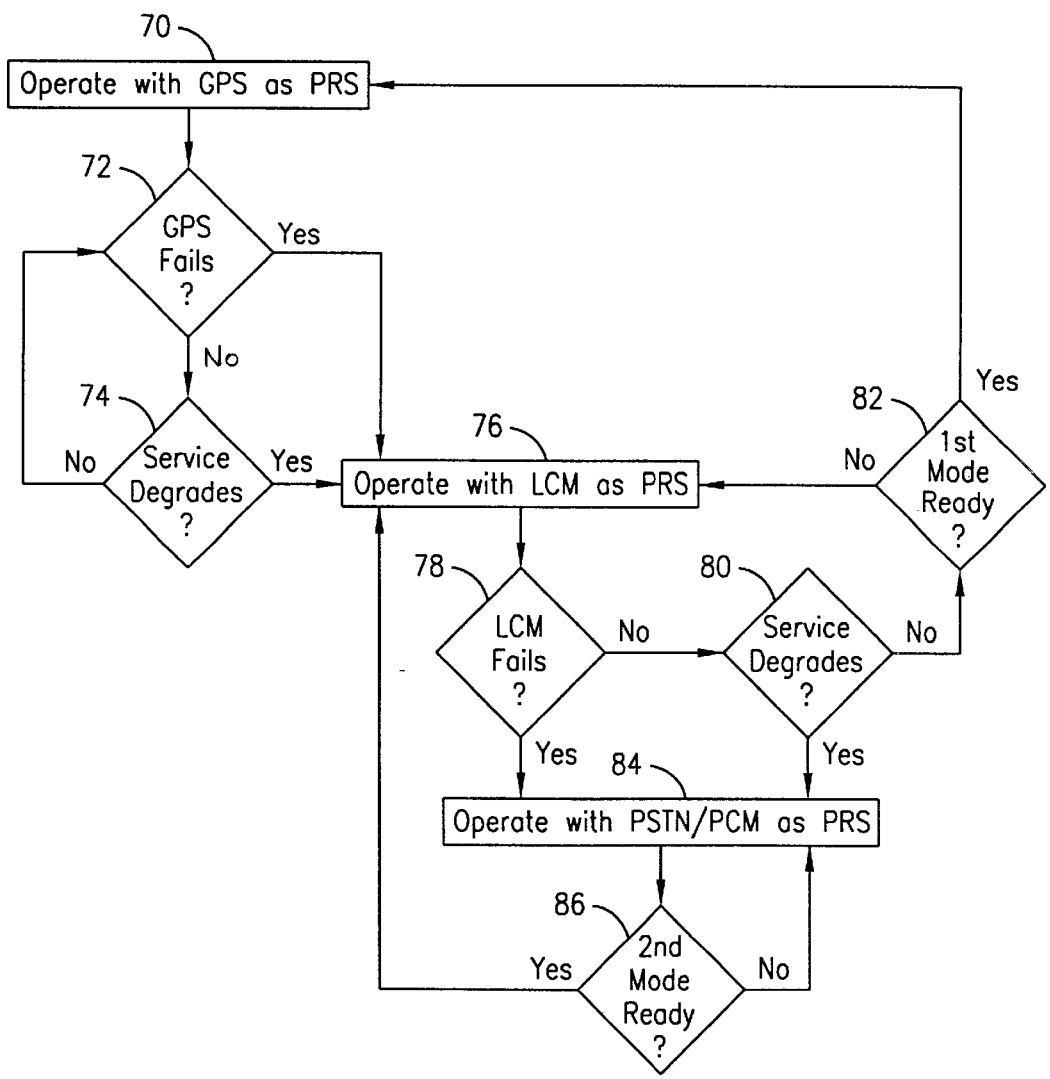
FIG. 3 is a flow diagram illustrating operation of the synchronization system of the present invention in changing modes of operation.

Reference is now made to FIG. 3 wherein there is shown a flow diagram illustrating operation of the synchronization system 12 of the present invention in changing modes of operation. Preferably, the synchronization system 12 operates in its first mode of operation (step 70) wherein the global positioning system is utilized as the primary reference source in a star network type topology (see, FIG. 2A). In this mode, GPS receiver supplied stratum 1 classified clock pulses are provided to each mobile switching center and base station, with the pulses used to derive a system clock. While configured in the first mode of operation, the synchronization manager functionality of the transport network management system monitors network operation in step 72 for a failure of a GPS receiver or of the GPS system. The first mode of operation (with a stratum 1 classified synchronization clock pulse supplied to the mobile switching centers and base stations) supports an absolute frequency tolerance with respect to synchronization of better than +/−0.05 parts per million (ppm). The synchronization manager functionality further monitors network operation in step 74 to detect any degradation in timing tolerances below an acceptable level (such as, for example, a degradation in measured absolute frequency tolerance exceeding +/−0.05 ppm). If neither determination of step 72 or step 74 is satisfied, the process for operation of the synchronization system remains in the first mode of operation (step 70) and continues to cycle through the determinations of step 72 and 74.

In response to an affirmative determination in either step 72 or step 74, the synchronization manager functionality reconfigures the synchronization system 12 in step 76 to operate in its second mode of operation wherein the local clock module is utilized as the primary reference source in a tree or linear network type topology (see, FIGS. 2B and 2C). In this mode, the local clock modules independently generate stratum 2 classified synchronization clock pulses to their associated mobile switching centers for use in deriving the system clock. Synchronization information is further conveyed to the base stations (who also derive the system clock) from each mobile switching center using the clock distribution system. While configured in the second mode of operation, the synchronization manager functionality of the transport network management system monitors network operation in step 78 for a failure of a local clock module. This second mode of operation (with a stratum 2 classified synchronization clock pulse supplied to the mobile switching centers and base stations) supports an absolute frequency tolerance with respect to synchronization of approximately +/−0.5 ppm. The synchronization manager functionality further monitors network operation in step 80 to detect any degradation in timing tolerances below an acceptable level (such as, for example, a degradation in measured absolute frequency tolerance exceeding +/−0.5 ppm). If neither determination of step 78 or step 80 is satisfied, the process for operation of the synchronization system remains in the second mode of operation (step 76) and continues to cycle through the determinations of step 78 and 80, unless a determination is made in step 82 that operation in the first mode is again available. If the determination of step 82 is affirmative (for example, if the global positioning system or GPS receiver becomes available, or if the measured absolute frequency tolerance satisfies the requisite threshold), the synchronization manager functionality reconfigures the synchronization system 12 in step 70 to operate in its first mode of operation.

In response to an affirmative determination in either step 78 or step 80, the synchronization manager functionality reconfigures the synchronization system 12 in step 84 to operate in its third mode of operation wherein PSTN pulse code modulated (PCM) communication derived timing is utilized as the primary reference source in a tree or linear network type topology (see, FIGS. 2B and 2C). In this mode, the mobile switching centers derive stratum 3E classified synchronization information from which the system clock may be derived. Synchronization information is further conveyed to the base stations (who also derive the system clock) from each mobile switching center using the clock distribution system. This third mode of operation (with a stratum 3E classified synchronization provided to the mobile switching centers and base stations) supports an absolute frequency tolerance with respect to synchronization of approximately +/−4.6 ppm. While configured in the third mode of operation, the synchronization manager functionality of the transport network management system monitors network operation in step 86 to determine whether operation in the second mode is again available. If the determination of step 86 is affirmative (for example, if the local clock module becomes available, or if the measured absolute frequency tolerance satisfies the requisite threshold), the synchronization manager functionality reconfigures the synchronization system 12 in step 76 to operate in its second mode of operation. Reconfiguration back to the first mode of operation is also possible if the processing determination of step 82 (as described above) is satisfied.

Reference is now once again made to FIG. 1. Access to stratum 1 classified synchronization at each mobile switching center 14 and base station 18 with an absolute frequency tolerance of better than +/−0.05 ppm makes it possible for the wireless communications network 10 to offer a number of value added services. Provision of these services is coordinated through the synchronization manager functionality 52 of the transport network management system 28. A first of these services comprises a service for geographically locating traveling mobile stations 24. A second of these services comprises a service for time stamping uplink and downlink wireless communications network 10 communications.

Figure 5:
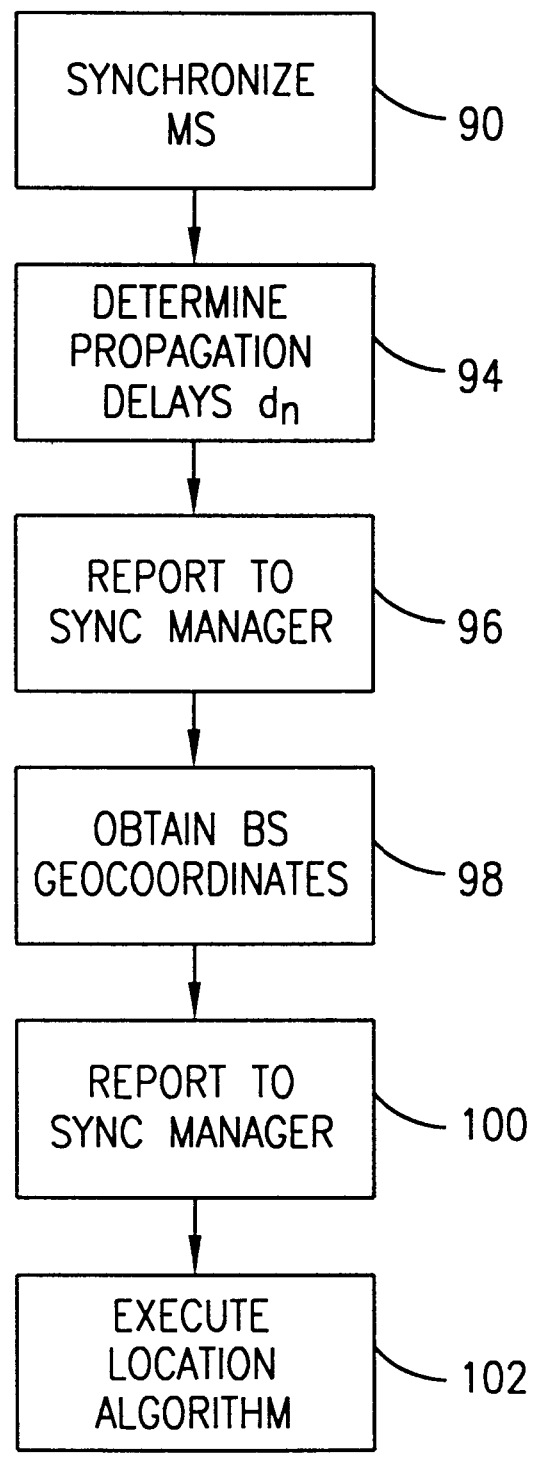
FIG. 5 is a flow diagram illustrating operation of the process for geographically locating a traveling mobile station.

Reference is now made to FIG. 4 wherein there is shown a diagram illustrating provision of the service for geographically locating a traveling mobile station 24, and also to FIG. 5 wherein there is shown a flow diagram illustrating operation of the process for geographically locating a traveling mobile station. The mobile stations 24 are synchronized (step 90) to network 10 operation (i.e., overall system time) through communications made by the base stations 18 over the air interface (corrected for propagation delays). Thus, plural base stations 18 and a single mobile station 24 in communication 92 with each other are coordinated to an identical timing (system clock) reference, and precise propagation delays (d1, d2 and d3) between the mobile station and each base station may be synchronously determined (step 94). These determined propagation delays with respect to the mobile station 24 are collected at the synchronization manager functionality 52 (step 96). Furthermore, the geo-coordinates (g1, g2 and g3) for each base station 18 involved in the communication 92 with the mobile station 24 may be obtained from the GPS receiver 54 (step 98) and communicated to the synchronization manager functionality 52 (step 100). It will, of course, be understood that the geo-coordinate information for all base stations 18 alternatively may be collected at initial network configuration and stored by the synchronization manager 52 for subsequent application in making mobile station location determinations. Using the base station geo-coordinate information (g1, g2 and g3) and base station/mobile station propagation delay information (d1, d2 and d3), a triangulation/arcuation algorithm is then utilized in step 102 to determine the geographic location of the mobile station 24 at the intersection point 104 between arcs 106 centered at the base station geo-coordinates (g1, g2 and g2) and having a radius associated with the determined propagation delays (d1, d2 and d3). Assuming network synchronization with an absolute frequency tolerance of better than +/−0.05 ppm and the acquisition of propagation delay (dn) information from at least three base stations, the triangulation/arcuation algorithm is capable of determining the geographic location 104 of the mobile station 24 with an accuracy of better than one-hundred meters.

Reference is now made to FIG. 6 wherein there is shown a more detailed block diagram of the mobile switching center 14 supporting provision of the service for time stamping pooled transcoder handled data communications. As discussed above, the mobile switching center 14 supports network 10 synchronization system 12 operation by including a local clock module (LCM) 40. The local clock module 40 generates and supplies a synchronization clock pulse to its connected mobile switching center 14 over clock link 42.

Each local clock module 40 is further connected to a clock distribution (CD) system 44 within the mobile switching center 14. The clock distribution system 44 within the mobile switching center 14 is further connected to the clock distribution systems of its base stations 18 using unidirectional communications links 48, and to the clock distribution systems of other mobile switching centers using bi-directional communications links 50. The mobile switching center 14 further includes a global positioning system (GPS) receiver 54. The GPS receiver 54 provides both a synchronization clock pulse and time/date information to the local clock module 40. This time/date information is made available for use by the mobile switching center over link 58. The mobile switching center 14 further includes a set of pooled transcoders 120. These transcoders 120 function to convert between pulse code modulated communications and coded voice communications in a manner well known in the art. The GPS provided time/date information is utilized by the pooled transcoders 120 for the purpose of time stamping data communications information that is being handled by the transcoders as it is passed through the mobile switching center. Time stamping advantageously provides timing reference information related to coordinating communications whose time synch on the uplink and downlink may not be identical.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A mobile communications network, comprising:
   plurality of mobile switching centers;
   a synchronization system implementing a star network type topology mode of operation wherein a global positioning system (GPS) comprises a primary reference source for synchronization, and each mobile switching center includes a global positioning system receiver in communication with the global positioning system and operable to supply a stratum 1 classified clock pulse for use in synchronizing mobile switching center operation and deriving a system clock;
   a transport network management system including a synchronization manager functionality for controlling a synchronization mode of operation for the synchronization system; and
   means for supporting synchronization mode communication between the transport network management system and the synchronization system.

2. The network as in claim 1 further including a local clock module within each mobile switching center, the local clock module connected to receive the global positioning system receiver supplied stratum 1 classified clock pulse and generate in response thereto a corresponding stratum 1 classified synchronization clock pulse for synchronizing mobile switching center operation to the derived system clock.

3. The network as in claim 2 further including:
   a plurality of base stations connected to the mobile switching centers, each base station including a global positioning system receiver in communication with the global positioning system and operable to supply a stratum 1 classified clock pulse for use in synchronizing base station operation and deriving a system clock;
   a local clock module within each base station, the local clock module connected to receive the global positioning system receiver supplied stratum 1 classified clock pulse and generate in response thereto a corresponding stratum 1 classified synchronization clock pulse for synchronizing base station operation to the derived system clock;

a clock distribution module within each mobile switching center and base station, the clock distribution module connected to the local clock module; and a first communications link between each base station clock distribution module and the mobile switching center clock distribution module over which system clock synchronization information is communicated.

4. The network as in claim 3 wherein the first communications link supports unidirectional communication from the mobile switching center clock distribution module to the base station clock distribution module.

5. The network as in claim 3 further including a second communications link between the mobile switching center clock distribution module and clock distribution modules of other mobile switching centers over which system clock synchronization information is communicated.

6. The network as in claim 5 wherein the second communications link supports bidirectional communication between mobile switching center clock distribution modules.

7. A mobile communications network, comprising:

a plurality of mobile switching centers;

a synchronization system implementing a star network type topology mode of operation wherein a global positioning system (GPS) comprises a primary reference source for synchronization, and each mobile switching center includes a global positioning system receiver in communication with the global positioning system and operable to supply a stratum 1 classified clock pulse for use in synchronizing mobile switching center operation and deriving a system clock and further implementing a tree or linear network type topology mode of operation with a local clock within the mobile switching center comprising the primary reference source for synchronization; and a synchronization manager functionality for selectively configuring the synchronization mode of operation for the synchronization system between the star network type topology and the tree or linear network type topologies.

8. The network as in claim 7 further including:

a plurality of base stations connected to the mobile switching centers, and a local clock within each base station that is synchronized to the local clock within the mobile switching center when the synchronization system is configured in the tree or linear network type topology modes of operation.

9. A mobile communications network, comprising:

a mobile switching center;

a plurality of base stations connected to the mobile switching center; and a synchronization system implementing a star network type topology mode of operation wherein a global positioning system (GPS) comprises a primary reference source for synchronization, and each mobile switching center and base station includes a global positioning system receiver in communication with the global positioning system and operable to supply a stratum 1 classified clock pulse for use in synchronizing mobile switching center and base station communications operation and deriving a system clock;

a transport network management system including a synchronization manager functionality for controlling a synchronization mode of operation for the synchronization system; and means for supporting synchronization mode communication between the transport network management system and the synchronization system.

10. The network as in claim 9 further including a local clock module within each mobile switching center and base station, the local clock module connected to receive the global positioning system receiver supplied stratum 1 classified clock pulse and generate in response thereto a corresponding stratum 1 classified synchronization clock pulse for synchronizing mobile switching center and base station operation to the derived system clock.

11. The network as in claim 10 further including:

a clock distribution module within each mobile switching center and base station, the clock distribution module connected to the local clock module; and a first communications link between each base station clock distribution module and the mobile switching center clock distribution module over which system clock synchronization information is communicated.

12. The network as in claim 11 wherein the first communications link supports unidirectional communication from the mobile switching center clock distribution module to the base station clock distribution module.

13. The network as in claim 11 further including a second communications link between the mobile switching center clock distribution module and clock distribution modules of other mobile switching centers over which system clock synchronization information is communicated.

14. The network as in claim 13 wherein the second communications link supports bidirectional communication between mobile switching center clock distribution modules.

15. The network as in claim 9 wherein the means for supporting comprises a separate data communications network established between the mobile switching center and base stations.

16. The network as in claim 9 wherein the means for supporting comprises an embedded operations and maintenance channel supported by communications links interconnecting mobile switching centers and base stations.

17. The network as in claim 9:

wherein the mobile switching center is connected for telephonic communication with a public switched telephone network (PSTN);

wherein the synchronization system further implements a linear network type topology mode of operation with pulse code modulated communications links of the public switched telephone network comprising the primary reference source for synchronization; and wherein the synchronization manager functionality of the transport network management system selectively configures the synchronization mode of operation for the synchronization system between the star network type topology and the linear network type topology.

18. A mobile communications network, comprising:

a mobile switching center;

a plurality of base stations connected to the mobile switching center;

a synchronization system implementing a star network type topology mode of operation wherein a global positioning system (GPS) comprises a primary reference source for synchronization, and each mobile switching center and base station includes a global positioning system receiver in communication with the global positioning system and operable to supply a stratum 1 classified clock pulse for use in synchronizing mobile switching center and base station communications operation and deriving a system clock and further implementing a linear network type topology mode of operation with a local clock within the mobile switching center comprising the primary reference source for synchronization; and a synchronization manager functionality for selectively configuring the synchronization mode of operation for the synchronization system between the star network type topology and the linear network type topology.

19. The network as in claim 18 further including a local clock within each base station that is synchronized to the local clock within the mobile switching center when the synchronization system is configured in the linear network type topology mode of operation.

20. The network as in claim 18 wherein the local clock within the mobile switching center is synchronized to a global positioning system clock pulse when the synchronization system is configured in the star network type topology mode of operation, and further including a local clock within each base station that is also synchronized to the global positioning system clock pulse when the synchronization system is configured in the star network type topology mode of operation.

* * * * *

UNITED STATES PATENT AND TRADEMARK OFFICE
CERTIFICATE OF CORRECTION

PATENT NO. : 6,256,507 B1
DATED : July 3, 2001
INVENTOR(S) : Yves Lemieux

It is certified that error appears in the above-identified patent and that said Letters Patent is hereby corrected as shown below:

<u>Column 1,</u>
Line 8, replace "network" with -- networks --
Line 9, replace "telecommunicating" with -- telecommunications --

Signed and Sealed this

Twenty-sixth Day of March, 2002

Attest:

JAMES E. ROGAN
*Attesting Officer*   *Director of the United States Patent and Trademark Office*